United States Patent
Liu et al.

(10) Patent No.: US 7,461,684 B2
(45) Date of Patent: Dec. 9, 2008

(54) CASTING PROCESS AND ARTICLES FOR PERFORMING SAME

(75) Inventors: Jianxin Liu, N. Huntingdon, PA (US); Michael L. Rynerson, Boston, MA (US)

(73) Assignee: The Ex One Company, LLC, Irwin, PA (US)

( * ) Notice: Subject to any disclaimer, the term of this patent is extended or adjusted under 35 U.S.C. 154(b) by 579 days.

(21) Appl. No.: 10/416,148

(22) PCT Filed: Feb. 25, 2003

(86) PCT No.: PCT/US03/05903

§ 371 (c)(1),
(2), (4) Date: May 7, 2003

(87) PCT Pub. No.: WO2004/018132

PCT Pub. Date: Mar. 4, 2004

(65) Prior Publication Data

US 2004/0140078 A1  Jul. 22, 2004

Related U.S. Application Data

(60) Provisional application No. 60/404,642, filed on Aug. 20, 2002.

(51) Int. Cl.
 *B22D 19/14* (2006.01)
(52) U.S. Cl. .................................................. 164/97
(58) Field of Classification Search ............ 164/6, 164/9, 14, 15, 23, 91, 93, 94, 95, 97, 98, 164/34
See application file for complete search history.

(56) References Cited

U.S. PATENT DOCUMENTS 3,722,574 A   3/1973   Anderson et al.

(Continued)

FOREIGN PATENT DOCUMENTS

EP   0 834 366 A 1   8/1998

(Continued)

OTHER PUBLICATIONS

PCT International Search Report for PCT/US03/05903; Issued May 30, 2003.

(Continued)

*Primary Examiner*—Kevin P Kerns
(74) *Attorney, Agent, or Firm*—IP & Internet Law North, LLC; Thomas Lizzi, Esq.

(57) ABSTRACT

A method for producing a cast article comprises using a porous powder article as a sacrificial pattern. The porous powder article is preferably made using a rapid prototyping process. The porous powder article is used as a sacrificial pattern for a mold into which a molten metal is cast. Some embodiments include a step of proving the porous powder article with a ceramic coating. Methods of making molds and patterns using a porous powder article are also disclosed. The powder comprising the porous powder article may be a metal, ceramic or cermet. In some embodiments, the powder alloys with the molten casting metal. In some other embodiments, the powder and the casting metal form a composite. Sacrificial casting mold patterns comprising porous powder articles and casting molds comprising such sacrificial patterns are also disclosed.

27 Claims, 2 Drawing Sheets

U.S. PATENT DOCUMENTS

| | | | |
|---|---|---|---|
| 4,093,017 A * | 6/1978 | Miller et al. ............... 164/28 |
| 4,312,398 A | 1/1982 | Van Blunk |
| 4,476,916 A | 10/1984 | Nusbaum |
| 4,491,558 A * | 1/1985 | Gardner .................... 419/23 |
| 4,587,707 A * | 5/1986 | Nishida et al. ............ 29/527.7 |
| 4,617,979 A | 10/1986 | Suzuki et al. |
| 4,832,105 A | 5/1989 | Nagan et al. |
| 5,010,945 A | 4/1991 | Burke |
| 5,052,463 A | 10/1991 | Lechner et al. |
| 5,113,925 A | 5/1992 | Cook |
| 5,119,864 A | 6/1992 | Langensiepen et al. |
| 5,197,528 A | 3/1993 | Burke |
| 5,204,055 A | 4/1993 | Sachs et al. |
| 5,234,045 A | 8/1993 | Cisko |
| 5,297,609 A | 3/1994 | Cook |
| 5,322,109 A | 6/1994 | Cornie |
| 5,340,656 A | 8/1994 | Sachs et al. |
| 5,387,380 A * | 2/1995 | Cima et al. ................ 264/69 |
| 5,394,930 A | 3/1995 | Kennerknecht |
| 5,487,420 A | 1/1996 | Newkirk |
| 5,490,882 A | 2/1996 | Sachs et al. |
| 5,511,603 A | 4/1996 | Brown et al. |
| 5,524,696 A | 6/1996 | Osborne et al. |
| 5,553,657 A | 9/1996 | Aghajanian et al. |
| 5,553,658 A | 9/1996 | Cornie |
| 5,649,585 A | 7/1997 | Nolte et al. |
| 5,687,788 A * | 11/1997 | Caldarise et al. ........... 164/456 |
| 5,765,624 A * | 6/1998 | Hathaway et al. ............. 164/97 |
| 5,839,329 A * | 11/1998 | Smith et al. ................ 76/108.2 |
| 5,983,973 A | 11/1999 | Cornie |
| 6,148,899 A | 11/2000 | Cornie et al. |
| 6,170,560 B1 * | 1/2001 | Daily et al. ................ 164/516 |
| 6,354,361 B1 * | 3/2002 | Sachs et al. ................ 164/128 |
| 6,360,809 B1 | 3/2002 | Cornie et al. |
| 6,397,922 B1 * | 6/2002 | Sachs et al. ................ 164/4.1 |
| 6,405,785 B1 * | 6/2002 | Gellert et al. ............... 164/312 |
| 6,446,697 B1 * | 9/2002 | Shaikh et al. ............... 164/4.1 |
| 6,585,930 B2 * | 7/2003 | Liu et al. .................... 419/7 |
| 6,776,219 B1 * | 8/2004 | Cornie et al. ............... 164/516 |
| 2002/0096306 A1 | 7/2002 | Butcher et al. |
| 2003/0024611 A1 | 2/2003 | Cornie et al. |
| 2003/0164206 A1 | 9/2003 | Cornie et al. |

FOREIGN PATENT DOCUMENTS

| | | |
|---|---|---|
| GB | 2 301 545 A | 11/1996 |
| WO | WO 99/38630 | 8/1999 |

OTHER PUBLICATIONS

"A Method of Generating Casting Tooling Using Negative Stereolithographic Solid Modeling" Res. Discl., Kenneth Mason Publ., Hampshire BG, No. 325, May 1, 1991.

* cited by examiner

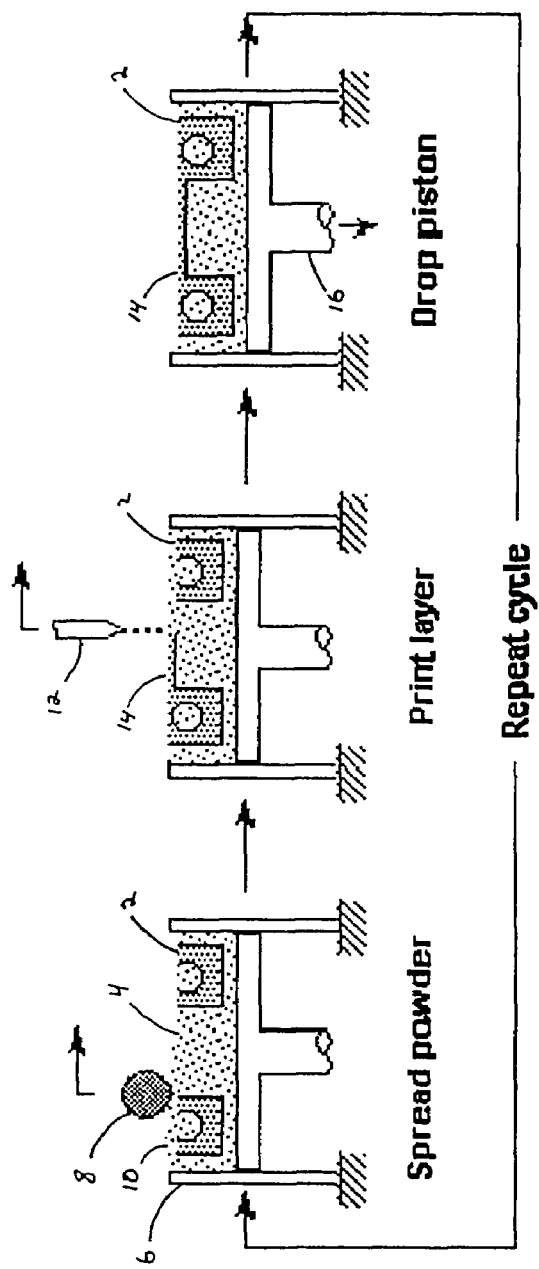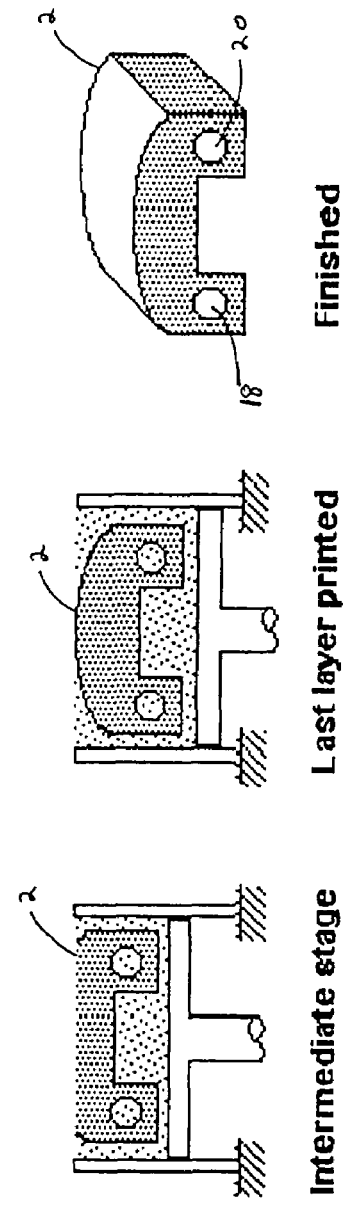
FIG. 1A (PRIOR ART)
FIG. 1B (PRIOR ART)
FIG. 1C (PRIOR ART)
FIG. 1D (PRIOR ART)

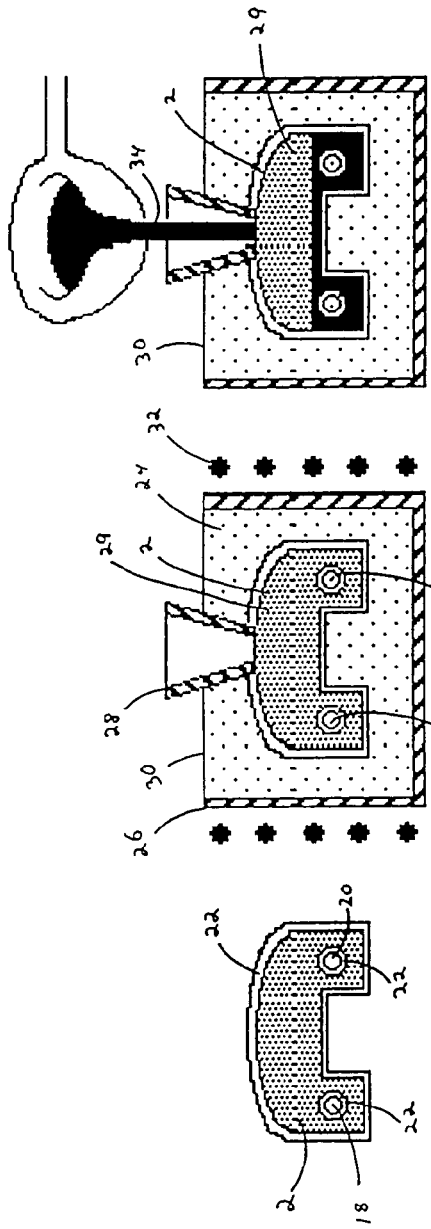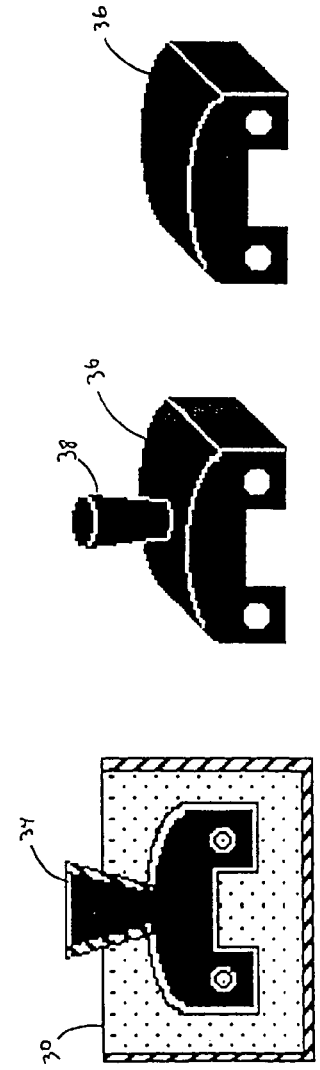

CASTING PROCESS AND ARTICLES FOR PERFORMING SAME

CROSS-REFERENCE TO RELATED APPLICATIONS

This application claims priority to U.S. Provisional Application No. 60/404,642, filed Aug. 20, 2002, which is incorporated herein by reference in its entirety.

TECHNICAL FIELD

The present invention relates to methods of casting metal and composite articles utilizing a mold, which mold comprises a porous powder article as a sacrificial pattern. The invention further relates to methods of producing such molds and patterns as well as to the molds and patterns themselves. Preferably, the porous powder article is produced by a rapid prototyping process.

BACKGROUND ART

A casting or cast article is simply an article that is produced by allowing a molten metal to solidify in a mold. A cast article takes the shape of the mold in which it was cast. Cast articles are used as components in many industrial and consumer products.

Persons skilled in the art will understand, however, that this overly-simplified, generalized description of a casting is not intended by the inventors to mean that all processes that produce confined, solidified, once-molten metal are casting processes or that they produce castings. For example, persons skilled in the art recognize that a casting does not result from an infiltration process and that the process of infiltrating is not a casting process, even when the porous article that is being infiltrated is confined for support during infiltration; instead, they understand that what results from an infiltration process is an infiltrated article. Persons skilled in the art understand that infiltrating refers to a process in which a solidifiable liquid, such as a molten metal, is introduced into the interconnected porosity of a porous body by capillary force-driven or pressure-assisted wicking or imbibing. In other words, it is a process of filling the pores of a sintered or unsintered powder metallurgical compact with a liquid such as a molten metal which subsequently solidifies within the compact to form a dense article. Infiltration, by design and nature, is a complementary second step that is employed after a porous article has been produced. Its purpose is to densify the porous article while maintaining the overall structure of the porous article. In other words, the structure of the article is set in the process by which the porous article is made and then the density and other properties of the article are enhanced by the infiltration step.

Rather, a person skilled in the art would understand the term "casting" to refer to a process in which a solidifiable liquid, such as molten metal, is poured or injected into a mold and subsequently forms an article by solidifying in the shape of the mold. Such a person would understand casting to involve a solidifiable liquid flowing into a mold by bulk flow mechanisms and at volume flow rates that are substantially different from those predominating in infiltration. Note that whereas in infiltration the infiltrant fills voids and porosity within a preexisting porous article to densify the porous article, in conventional casting the article does not preexist. Rather, what preexists is a shaped volume defined by a mold and its adjacent free surfaces. During casting, the cast liquid is made to fill this shaped volume so that upon solidification of the liquid an article results having the shape of the shaped volume. Such an article is what one skilled in the art would call a "cast article" or more simply a "casting."

The type of mold used depends in large part on the casting process selected. From the dawn of metal casting until recently, sand has been far and away the most common molding media into which the molten metal is cast. Molds may be made from other materials, for example, there are metal molds, graphite molds, and plaster molds. In many cases, patterns are used in the making of the mold in which the casting is formed. Some patterns may be re-used hundreds or even thousands of times, while others are single-use patterns which are destroyed during the mold making process.

There are a number of known casting processes, each with its particular benefits and drawbacks. These processes include sand casting, investment casting, gravity or low-pressure permanent mold casting, high-pressure die casting, thixomolding, centrifugal casting, plaster or shell mold casting, and squeeze casting.

Mold making is often a costly and time-consuming endeavor. The molds, or the patterns for the molds, may be machined to exacting detail by skilled craftsmen, sometimes using complex and expensive automated machining processes. The mold or pattern making requirements of casting processes often lead to long delivery times for the first cast articles. For example, investment casting may require three months to prepare the first casting. Die castings and permanent mold casting may require even longer lead times, which may approach six months. However, designers of new products increasingly require short turnaround times as they may change a design several times from initial ideal to final component.

Rapid prototyping may be used by designers to quickly obtain a three-dimensional model of a new design. The term "rapid prototyping" refers to a class of technologies that construct physical models from Computer-Aided Design (CAD) data in relatively short time periods. Rapid prototyping is also known within the art as "solid free form fabrication processing." Rapid prototyping methods are sometimes referred to as "three dimensional printers," because they allow designers to quickly create tangible three-dimensional prototypes of their designs from a computer file, rather than just two-dimensional pictures. The models produced by rapid prototyping have many uses. For example, they make excellent visual aids for communicating ideas with co-workers or customers. Additionally, wax models made by rapid prototyping methods have been used as patterns in the lost wax casting process. Although rapid prototyping methods are well suited to making prototypes, persons skilled in the art will understand that the products of rapid prototyping methods are not limited to simply being prototypes.

Two examples of commercially available rapid prototyping systems are three-dimensional printing (3DP) and selective laser sintering (SLS). Both of these processes build up a physical model on a layer-by-layer basis to produce a three-dimensional article made of powder bonded by a polymer binder. Such processes are capable of creating objects with complicated internal features, for example, passageways, that cannot be manufactured by other means. The 3DP process is conceptually similar to ink-jet printing. However, instead of ink, the 3DP process deposits a polymer glue. This polymer glue is printed onto a powder layer according to a two-dimensional slice of a three-dimensional computer representation of the desired object. The SLS process builds an article by fusing together polymer-coated powder particles. A computer-driven laser beam scans each powder layer and fuses together the polymer coatings of adjacent particles to bind the particles together in the form of a cohesive article.

The 3DP and SLS processes produce porous powder articles that typically consist of from about 30 to over 60 volume percent powder, depending on powder packing density and about 10 volume percent binder, with the remainder being void space. The porous powder article made by either of these processes is somewhat fragile and conventionally is thermally processed to yield a fully dense part having improved mechanical properties. A typical thermal process consists of debinding, powder sintering, and infiltrating the sintered article with a secondary molten metal.

DISCLOSURE OF INVENTION

The present invention contemplates the use of a porous powder article that has a relative density of less than about 80% as a sacrificial casting pattern. Relative density is expressed in terms of percentage and is the ratio of the density the porous powder article actually has to the density the article would have if it contained no porosity or polymer binder. A fully dense article has a relative density of 100%. The term "porous" is used in the phrase "porous powder article" to indicate that the powder article is not fully dense. Preferably, the porous powder article has a low relative density, for example 30 to 40%, so as to allow for a correspondingly high portion of molten metal to be poured into the mold.

Some embodiments of the present invention enable cast articles to be made with short lead times by combining rapid prototyping technology with conventional casting methods. In such embodiments, a porous powder article consisting of powder bound together by a polymer binder is produced by a rapid prototyping technique. A casting mold is made using the porous powder article as a sacrificial pattern wherein the porous powder article is surrounded by casting sand in a casting flask. The flask assembly is heated to remove or decompose the porous powder article's polymer binder. Molten metal is cast into the mold comprising the porous powder article, wherein the porous powder article may melt or partially melt depending on the temperature of the molten metal and then solidifies together with the molten metal to form a cast article. In some preferred embodiments, the porous powder article is provided with a ceramic coating prior to surrounding it with the casting sand.

Porous powder articles may also be produced by other processes. Examples of such processes include, but are not limited to, die compaction, cold isostatic pressing, and the sintering of loose powder in a form. Although, in some cases, the use of porous powder articles made by methods other than rapid prototyping processes as sacrificial casting patterns might not reduce the initial design-to-casting time, nonetheless, their use as such provides a heretofore unknown method of making casting molds.

The porous powder article is used as a sacrificial casting pattern that determines the shape of the sand mold or ceramic shell that is formed about it. Like a conventional sacrificial casting pattern, the porous powder article is essentially destroyed during its one-time use. However, unlike a conventional sacrificial casting pattern, the powder that is its constituent material becomes an integral part of the cast article. In some cases, the powder of the porous powder article is wholly or partially melted by and mixes or alloys with the cast molten metal that is poured into the mold that contains the porous powder article. In other cases, the powder forms a composite material with the cast molten metal.

Methods of producing molds comprising a porous powder article as a sacrificial pattern are also contemplated. Such methods include the steps of making a porous powder article, for example, by employing rapid prototyping, and making a casting mold by using that porous powder article as a sacrificial pattern. Some embodiments include the step of providing the porous powder article with a ceramic coating.

Molds and sacrificial patterns comprising porous powder articles are also contemplated by the present invention.

Embodiments of the present invention which utilize a rapid prototyping process for making a porous powder article as a sacrificial pattern have the advantage that cast articles having complex shapes and internal features, such as passageways, can be cast in some cases without the need for a core insert in the mold.

Another advantage of the present invention is that some of its embodiments produce cast articles which may provide a homogeneous microstructure and are metallurgically hardenable through heat treatment. In contrast, conventionally infiltrated rapid prototyped articles generally are neither homogeneous nor hardenable.

Other features and advantages inherent in the subject matter disclosed and claimed will become apparent to those skilled in the art from the following detailed description of presently preferred embodiments thereof and to the appended drawings.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

FIGS. 1A-D illustrate successive steps in the creation of a porous powder article by a conventional rapid prototyping process.

FIG. 1A illustrates three steps in creating a single layer of the porous powder article.

FIG. 1B illustrates the porous powder article in a partially completed stage.

FIG. 1C illustrates the porous powder article after the last layer has been printed.

FIG. 1D illustrates the finished porous powder article.

FIGS. 2A-E illustrate successive steps of a method which utilizes the porous powder article illustrated in FIG. 1.

FIG. 2A illustrates the porous powder article after a refractory coating of ceramic has been formed on its external and internal surfaces.

FIG. 2B illustrates the preheating of the porous powder article of FIG. 2A packed in casting sand within a casting flask to form a casting mold.

FIG. 2C illustrates the casting of the molten metal into the casting mold of FIG. 2B.

FIG. 2D illustrates the solidification and cooling of the cast article cast in FIG. 2C.

FIG. 2E illustrates the cast article of FIG. 2D after it has been removed from the casting sand.

FIG. 2F illustrates the cast article of FIG. 2E after the sprue has been removed.

BEST MODE FOR CARRYING OUT THE INVENTION

In this section, some presently preferred embodiments of the present invention are described in detail sufficient for one skilled in the art to practice the present invention.

Preferred embodiments of the present invention may be employed to produce complex, close tolerance cast articles.

In some preferred embodiments, rapid prototyping is used to make a porous powder article that is subsequently used as a sacrificial pattern to make a casting mold. Rapid prototyping used with these embodiments may employ the following steps:
1. Creating a CAD model of the design. The article to be built is modeled using Computer-Aided Design (CAD) software. The designer may use a pre-existing CAD file or may wish to create one expressly for prototyping purposes.
2. Converting the CAD model to a stereolithographical file format called STL format. The STL format has been adopted as the standard of the rapid prototyping industry.
3. Slicing the STL computer model into a number of thin cross-sectional layers using a slicing algorithm program. Several such programs are available, and most allow the user to adjust the size, location and orientation of the model.
4. Producing the article on a rapid prototyping machine. The actual construction of the article is performed using a rapid prototyping machine to construct the article layer by layer.
5. Cleaning and finishing the article. This involves removing the article from the rapid prototyping machine and detaching any loose powder. Some minor cleaning and surface treatment of the article may also be necessary.

Such embodiments of the present invention may use any type of rapid prototyping process known to those skilled in the art which are capable of producing a porous powder article. Two such processes which are particularly preferred are 3DP and SLS. It is to be understood that persons skilled in the art will recognize that porous powder articles made by a rapid prototyping process are distinguishable from porous powder articles made by other methods by their unique structural characteristics. This is because, unlike other shape making processes, rapid prototyping processes do not distort the shape of the powder particles or produce interfacial bonding of adjacent powder particles. Additionally, rapid prototyping processes are able to produce porous powder articles having internal features, e.g., passageways, that cannot be manufactured by other means.

FIGS. 1A-D schematically illustrate successive steps in the creation of a porous powder article by a conventional rapid prototyping process. The porous powder article shown is a widget pattern 2. Referring to these figures, FIG. 1A illustrates the creation of a single layer of widget pattern 2 shown at a stage wherein the widget pattern 2 is only partially complete. The partially complete widget pattern 2 is surrounded by a powder bed 4 within the rapid prototyping machine 6. In the leftmost frame, a roller 8 evens out the top surface of the powder bed 4 distributing a powder layer 10 over the partially completed widget 2. In the center frame, a print head device 12 scans over the powder layer 10 to form a new top layer 14 for partially completed widget pattern 2. In a 3DP process, the print head device 12 may deliver a jet of a polymer binder into powder layer 10 to bind together adjacent powder particles. In a SLS process, the print head device 12 may direct a laser beam into powder layer 10 to fuse together the polymer coatings of adjacent powder particles. The rightmost frame shows the new layer 14 completed. Piston 16, which supports the powder bed 4, is next indexed downward to accommodate the addition of powder to the powder bed 4 for making the next powder layer on widget pattern 2.

FIG. 1B shows the widget pattern 2 at an intermediate stage after several more layers have been deposited. FIG. 1C shows the widget pattern 2 after the last layer has been printed. FIG. 1D shows the finished widget 2 after it has been removed from the powder bed 4 of the rapid prototyping machine 6. Note that widget pattern 2 contains internal passages 18, 20.

Porous powder articles produced by rapid prototyping or other means are used as one-use patterns for casting molds. For example, the porous powder article may be used to replace the foam or wax pattern in a process that is similar to the conventional lost foam or lost wax process casting process. Lost foam or lost wax processes are also known as investment casting processes, where the word "investment" is used to indicate that the expendable foam or wax pattern is covered with an outer layer of ceramic. In conventional investment casting processes, the applied ceramic layer is made to create a solid shell around the foam or wax pattern. The coated pattern is heated to remove or lose the foam or wax. The resulting hollow ceramic shell may be supported by casting sand in a casting flask to make a casting mold. The ceramic shell also prevents the molten metal from contacting the surrounding casting sand.

Some embodiments of the present invention modify the conventional investment casting process in that the porous powder article that acts as the sacrificial pattern is not removed or lost prior to the casting of the molten metal, but instead combines with the cast molten metal to form the cast article. Such embodiments may include the following steps which are illustrated in FIGS. 2A-F.

Referring to FIG. 2A, the porous powder article illustrated is widget pattern 2 from FIGS. 1A-D. The widget pattern 2 is coated with a ceramic to form a ceramic shell 22 on its exterior surface and on any interior surfaces it may have, for example, the surfaces of interior passageways 18, 20. The coating that forms ceramic shell 22 may be applied as in conventional investment casting, for example, by dipping, spraying, or pouring using a ceramic slurry. The wetting angle of the slurry with respect to the surface of the porous powder article, for example, widget pattern 2, should be greater than about 90 degrees in order to avoid infiltrating the slurry into the porous powder article. The coating may be dried under ambient conditions or special drying conditions, for example, in conditions that are obtainable in a heated oven. The ceramic may be any ceramic, including those that are conventionally used in investment casting, that is physically and chemically compatible with the molten metal that is to be cast and with the component materials of the porous powder article.

Referring to FIG. 2B, the ceramic coated widget pattern 2 is surrounded by casting sand 24 within a vented casting flask 26. Due to the complexity of the geometry of a particular porous powder article, the casting sand 22 might not easily flow into certain areas, for example, passageways 18, 20 of widget pattern 2. The flow and proper compaction of the casting sand 24 around and into internal passageways 18, 20 of the widget pattern 2 can be enhanced by use of a vibration table. Care must be taken to compact the casting sand 24 without distorting the widget pattern 2 or the ceramic coating 22. Prior to surrounding the ceramic coated widget pattern 2 with the casting sand 24, a portion of the ceramic coating 22 is removed and a sprue 28 is set in place at that location to conduct the molten metal to the powder metal skeleton 29 of widget pattern 2. Gates and/or runners may also be used to help deliver the molten metal to the porous powder article. In some embodiments, the porous powder article is designed and constructed to have integral gates and/or runners.

After the casting sand 24 has been properly compacted, the flask assembly 30 is preheated by a preheating means 32, for example, an oven or an air torch, to a temperature at which the binder in the widget pattern 2 is either partially or completely removed through evaporation or decomposition. Gases and vapors given off during this debinding process may exit through the sprue 28 and any gates and runners that are being used. The preheating also reduces the heat loss of the molten cast metal during the casting process. The preheating process may be conducted in air, but, more preferably, is conducted in a controlled atmosphere so that the surface condition of the metal powder of the porous powder article is optimized for the casting process. For example, a protective atmosphere may be used to prevent the metal powder from oxidizing during the preheating. Examples of such protective atmospheres include hydrogen, nitrogen, argon, and combinations thereof.

Referring to FIG. 2C, after the flask assembly 30 has been preheated, molten metal 34 is cast through the sprue 28 into the widget pattern 2. The molten metal 34 melts the powder skeleton 29 and takes on the geometry of the widget pattern 2. In some embodiments, the molten metal 34 completely melts the powder of the skeleton 29, while in other embodiments the powder, in whole or in part, forms a composite with the molten metal 34. As with the preheating step, the casting step may be done either in air or under a protective atmosphere.

Referring to FIG. 2D, the flask assembly 30 is cooled to solidify the cast molten metal 34.

Referring to FIG. 2E, the solidified cast widget 36 is removed from the casting sand 24 and the ceramic coating 22 and the sprue 28 are removed from the cast widget 36.

Referring to FIG. 2F, the sprue casting 38 is removed from the cast widget 36. The cast widget 36 may then be cleaned and inspected.

Although in the discussion of FIG. 2A-F the step of casting the molten metal immediately followed the preheating step in which the binder was removed from the porous powder article, it is not necessary that these steps be conducted back-to-back. First, it is to be understood that a binder removal step is only necessary in cases where a binder must be removed from the porous powder article to prevent a deleterious reaction of the binder with the molten metal. In some embodiments, no binder removal step is required, because the porous powder article contains little or no binder, as in some cases where the porous powder article is formed by in a process which uses the application of a compaction pressure to bond the powder together by mechanical interlocking or by contact-point welding. Second, it is to be understood that the binder removal step, when used, may be done at any time prior to the casting step. For example, in some embodiments employing a ceramic coating, the binder may be removed even before the coated porous powder article is placed in the casting flask. In such embodiments, the coated porous powder article may be stored for a time period after binder removal and prior to placing it in the casting flask. In some embodiments, the entire casting flask may be placed in storage after the binder removal and then later reheated prior to casting. Third, it is to be understood that, except where preheating is necessary for binder removal or decomposition or to season the casting sand or a ceramic coating, preheating need only be done where it is necessary to prevent problems of premature solidification or to otherwise promote mold filling.

In some embodiments of the present invention, the powder of the porous powder article is a metal powder that is completely melted by and mixes or alloys with the cast molten metal. In such embodiments, it is important that the molten metal has sufficient superheat to melt the metal powder of the porous powder article. Assuming no heat transfer from the molten metal to the sand, the relationship between the temperature of the molten metal and the preheat temperature of the flask assembly in such cases is simply expressed as:

$$\text{fraction of metal powder} \times \left\{ \int_{T_{ph}}^{T_{mp}} C_{pp} dT + H_{mp} \right\} = \text{fraction of molten metal} \times \left\{ \int_{T_{mm}}^{T_{oh}} C_{pm} dT \right\}$$

where:

$T_{ph}$ is the preheat temperature of the flask assembly, which includes the porous powder article;
$T_{mp}$ is the melting temperature of the powder material;
$C_{pp}$ is the specific heat of the powder material;
$H_{mp}$ is the heat of fusion of the powder material;
$T_{mm}$ is the melting temperature of the molten metal;
$T_{oh}$ is the superheat temperature of the molten metal; and
$C_{pm}$ is the specific heat of the molten metal.

In some embodiments of the present invention, the porous powder article is used as a pattern for a casting mold without a ceramic shell being formed on it. Although such embodiments may not produce as smooth a surface as those that use a ceramic shell and may require the use of a mold release agent or additional cleaning and additional care during mold making to avoid distorting the porous powder article, they eliminate the cost of producing and removing a ceramic shell. However, the use of a ceramic coating is preferred as the coating helps protect the structural integrity of the porous powder article prior to casting.

Any type of powder that is compatible with the selected article-forming process may be used to make the porous powder article. The type of powder is to be selected depending on the cast metal that is to be used and the properties that are desired for the cast article. In many cases, the powder chosen will be an elemental metal or a metal alloy, but ceramic powders and cermets may also be used. For example, the powder may be iron or an iron alloy, including steel, for example, low carbon steel, medium carbon steel, high carbon steel, tool steel or stainless steel. The powder may also be nickel, a nickel alloy, aluminum, an aluminum alloy, titanium, a titanium alloy, copper, a copper alloy, magnesium, a magnesium alloy, zinc, a zinc alloy, an intermetallic compound, a refractory metal, or a refractory metal alloy. In most embodiments where the powder comprises a refractory metal, ceramic or cermet, the powder and the cast metal will form a cast article which has a composite structure.

The powder may have any type of particle shape. However, inasmuch as it is preferable that the relative density of the porous powder article be low, for example, in the range of 30-40%, irregular powder shapes are more preferable than spherical shapes in cases where the lower packing density attendant to irregular shaped powders results in the porous powder article having a low relative density.

The cast metal may be any metal that is amenable to casting. The melting temperature of the cast metal can be higher or lower than that of the powder of the porous powder article. In some embodiments, the casting metal and the powder of the porous powder article are of the same or similar compositions. For example, the casting metal may be unalloyed aluminum and the powder an aluminum alloy.

EXAMPLE

In recent years, there has been commercial pressure on foundries to introduce new casting designs at a faster pace. This has reduced the time available for a new design to go from a concept through the prototype stage and into industrial production. The following prophetic example describes an application of an embodiment of the present invention.

A widget of the same design that is shown in FIG. 2F as cast widget 36 is to be made of cooper-tin bronze with a final composition of 90% copper and 10% tin. The widget is to be 3 cm wide, 1.5 cm high and 1 cm deep. A CAD file of a three-dimensional model of the widget is created. The CAD file is converted to an STP formatted file. A slicing algorithm is applied to the STP file to create a widget file that is to be used with a 3DP process rapid prototyping machine to create a porous powder article of the widget. A high tin bronze powder is acquired which has a composition of 80% cooper and 20% tin and passes through a 140 mesh screen (106 micron opening size) and stands on a 325 mesh screen (45 micron opening size). A PROMETAL RTS 300 rapid prototyping machine, manufactured by Extrude Hone Corporation of Irwin, Pa., U.S., utilizes the widget file and the high tin bronze powder to make, by the 3DP process, a porous powder article which has a relative density of 50%.

The porous powder article is taken from the rapid prototyping machine and any excess powder is removed from the porous powder article. Gates and runners are attached to the porous powder article. A ceramic shell is coated onto the assembly of the porous particle article and its attached gates and runners by repeatedly dipping the assembly into a slurry of boron nitride and allowing the coating formed to dry. After the ceramic coating is created, the assembly is placed into a casting flask and a sprue is attached to the assembly. Casting sand is added to the casting flask and a vibration table is employed to help distribute the casting sand around the assembly, filling all internal and external voids, except those into which the molten metal is to be poured. A standard compaction technique is used to compact the casting sand around the assembly.

The flask assembly is heated to about 790° C. Under a protective atmosphere of nitrogen to remove the polymer binder that was applied during the 3DP process from the porous powder article. At the same time, pure copper is melted in a clay crucible at about 1200° C. by induction heating. The molten pure copper is poured into the sprue in the preheated flask assembly, which remains under the protective atmosphere of nitrogen. The molten pure copper flows into the porous powder article, melting and alloying with its powder and taking on its shape. After the casting solidifies and cools, it is removed from the casting sand. The ceramic coating is cleaned away, and the sprue, runner, and gates are removed from the widget. The widget has a composition of 90% copper and 10% tin and is ready for inspection, finishing, testing, or use.

While only a few embodiments of the present invention have been shown and described, it will be obvious to those skilled in the art that many changes and modifications may be made thereunto without departing from the spirit and scope of the invention as described in the following claims.

What is claimed is:

1. A method for producing a cast article comprising the steps of:
   a) providing a porous powder article having a relative density of less than about 80 percent;
   b) forming a mold having an article-forming cavity in the shape of the porous powder article by applying a moldable material around the porous powder article so that the porous powder article is the pattern for the article-forming cavity of the mold and the porous powder article fills the entire article-forming cavity;
   c) pouring a molten metal stream into the article-forming cavity, said molten metal stream extirpating the porous powder article to produce a liquid and/or solid residue, wherein said residue flows with the molten metal stream within the article-forming cavity and the residue-bearing molten metal fills the entire article-forming cavity; and
   d) solidifying the residue-bearing molten metal in the article-forming cavity to produce a cast article, wherein said cast article is not an infiltrated porous article;
   wherein, at the start of step (c), the temperature of the mold is lower than the solidus temperature of the molten metal.

2. The method of claim 1, further comprising the step of making the porous powder article by a solid free form fabrication process.

3. The method of claim 2, wherein the solid free form fabrication process is selected from the group consisting of three-dimensional printing and selective laser sintering.

4. The method of claim 1, further comprising the step of heating the mold.

5. The method of claim 4, further comprising the step of storing the mold after the step of heating the mold.

6. The method of claim 1, further comprising the step of heating the mold immediately prior to step (c).

7. The method of claim 4, wherein at least one of the steps of heating the mold and step (c) are done under a protective atmosphere.

8. The method of claim 7, wherein the protective atmosphere includes at least one of the group consisting of hydrogen, nitrogen, and argon.

9. The method of claim 1, wherein the porous powder article comprises a polymer binder, the method further comprising the step of debinding the porous powder article of the polymer binder prior to step (c).

10. The method of claim 1, further comprising the step of selecting the powder of the porous powder article and the molten metal so that the powder and the molten metal combine to form a composite material during step (d).

11. The method of claim 1, further comprising the step of selecting the powder of the porous powder article and the molten metal so that the molten metal at least partially melts the powder during step (c).

12. The method of claim 1, wherein the porous powder article has a relative density in the range of 30% to 40%.

13. The method of claim 1, further comprising the step of making the porous powder article to comprise at least one of the group consisting of a metal powder, a ceramic powder, and a cermet powder.

14. A method for producing a cast article comprising the steps of:
   a) providing a porous powder article having a relative density of less than about 80 percent;
   b) coating the porous powder article to create a ceramic shell on the porous powder article;
   c) forming a mold having an article-forming cavity in the shape of the coated porous powder article by applying a moldable material around the coated porous powder article so that the coated porous powder article is the pattern for the article-forming cavity of the mold and the coated porous powder article fills the entire article-forming cavity;
   d) pouring a molten metal stream into the article-forming cavity, said molten metal stream extirpating the porous powder article to produce a liquid and/or solid residue, wherein said residue flows with the molten metal stream within the article-forming cavity and the residue-bearing molten metal fills the entire article-forming cavity; and e) solidifying the residue-bearing molten metal in the article-forming cavity to produce a cast article, wherein said cast article is not an infiltrated porous article;

wherein, at the start of step (d), the temperature of the mold is lower than the solidus temperature of the molten metal.

15. The method of claim 14, further comprising the step of making the porous powder article by a solid free form fabrication process.

16. The method of claim 15, wherein the solid free form fabrication process is selected from the group consisting of three-dimensional printing and selective laser sintering.

17. The method of claim 14, wherein the porous powder article comprises a polymer binder, the method further comprising the step of debinding the porous powder article of the polymer binder prior to step (d).

18. The method of claim 17, further comprising the step of storing the porous powder article after the step of debinding the porous powder article.

19. The method of claim 14, further comprising the step of heating the mold.

20. The method of claim 19, further comprising the step of storing the mold after the step of heating the mold.

21. The method of claim 14, further comprising the step of heating the mold immediately prior to step (d).

22. The method of claim 19, wherein at least one of the steps of heating the mold and pouring are done under a protective atmosphere.

23. The method of claim 22, wherein the protective atmosphere includes at least one of the group consisting of hydrogen, nitrogen, and argon.

24. The method of claim 14, further comprising the step of selecting the powder of the porous powder article and the molten metal so that the powder and the molten metal combine to form a composite material upon cooling from step (e).

25. The method of claim 14, further comprising the step of selecting the powder of the porous powder article and the molten metal so that the molten metal at least partially melts the powder during step (d).

26. The method of claim 14, wherein the porous powder article has a relative density in the range of 30% to 40%.

27. The method of claim 14, further comprising the step of making the porous powder article to comprise at least one of the group consisting of a metal powder, a ceramic powder, and a cermet powder.

* * * * *